(No Model.)
A. PALENCSAR & T. FISCHER.
BELT STRETCHING MACHINE.
No. 554,085. Patented Feb. 4, 1896.
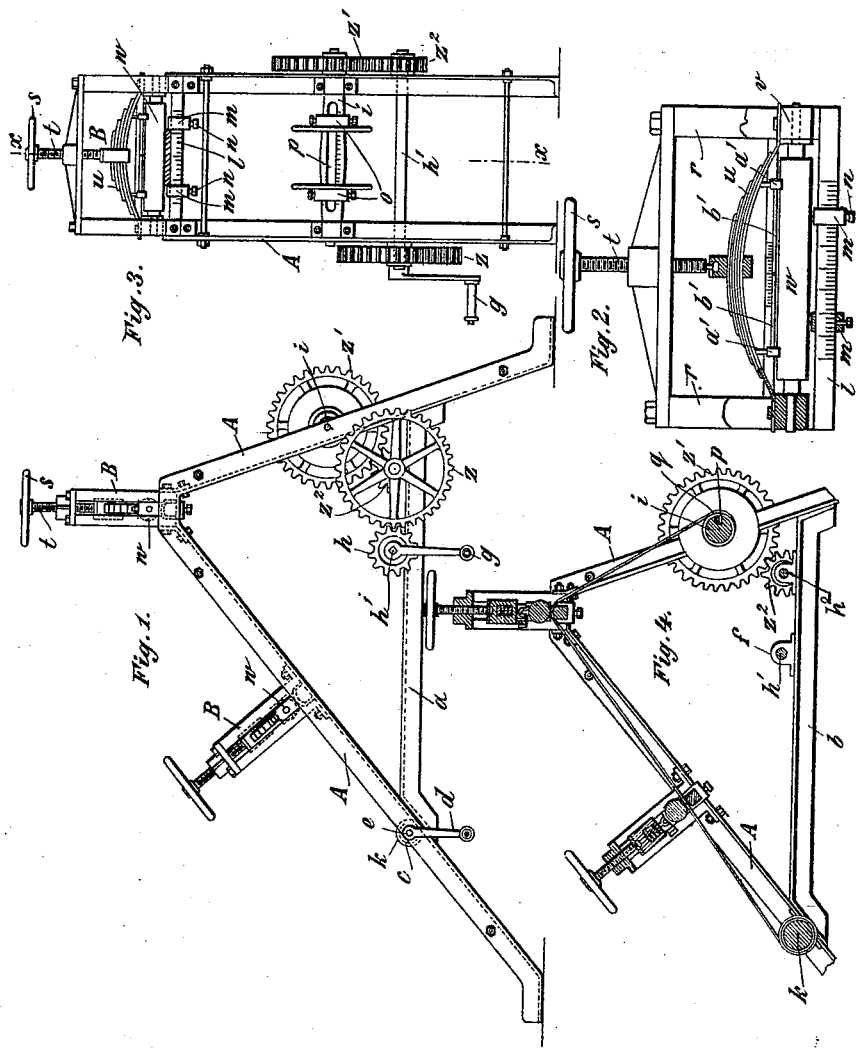
WITNESSES:
INVENTORS:
Andor Palencsar and
Theodor Fischer
By Knight Bros
Attys

UNITED STATES PATENT OFFICE.

ANDOR PALENCSAR AND THEODOR FISCHER, OF BUDA-PESTH, AUSTRIA-HUNGARY.

BELT-STRETCHING MACHINE.

SPECIFICATION forming part of Letters Patent No. 554,085, dated February 4, 1896.

Application filed February 14, 1895. Serial No. 538,327. (No model.)

*To all whom it may concern:*

Be it known that we, ANDOR PALENCSAR, engineer, and THEODOR FISCHER, merchant, of 2 Cömörint, Buda-Pesth, in the Empire of Austria-Hungary, have invented an Improved Belt-Stretching Machine, of which the following is a specification, reference being had therein to the accompanying drawings.

This invention relates to an apparatus for subjecting driving-belts to the same strain that they are subjected to in working, thereby obviating the necessity of subsequently tightening the belts after being used for the first time, and also insuring that the belt is sufficiently strong to stand the working strain put upon it.

Our invention is illustrated in the accompanying drawings, in which—

Figure 1 is a view in side elevation of the apparatus. Fig. 2 is a view in front elevation of the power-measuring device. Fig. 3 is an end elevation of our device. Fig. 4 is a view in sectional elevation on the line $x\ x$ of Fig. 3.

Throughout the views similar parts are marked with like letters of reference.

The apparatus consists of a frame A preferably made of angle-iron and connected together by suitable stays or struts $a$ and $b$. The frame A carries bearings $c\ c$ for a shaft $e$, provided with a cranked handle $d$. On the frame A are two tightening or stretching devices B B. On the stays $b$ are mounted bearings $f\ f$ to carry a shaft $h'$ provided with a cranked handle $g$. This shaft is geared with a shaft $i$ through spur-gearing $h\ z\ z^2\ z'$, the wheels $z$ and $z^2$ being mounted on a lay-axle $h^2$, so that when the cranked handle $g$ is turned the shaft $i$ is also rotated. The shaft $h'$ may be driven by means of a belt instead of by the cranked handle $g$, from any convenient source of power. On the shaft $e$ is fixed a pulley $k$ upon which the belt to be tested is coiled.

For the purpose of guiding the belts straight, movable stops $m$ are provided on bars $l$ arranged in front of the stretching devices, the said bars each having a divided scale. The stops $m$ are fixed in position to suit the width of the belt to be tested by means of set-screws $n$. A similar device is provided on the shaft $i$, except that in this case movable collars $o$ are employed in place of the stops $m$ and the divided scale is on the shaft. The shaft $i$ has a slot $p$ in which one end of the belt is held by means of a wedge $q$.

The straining device B consists of a frame $r$ carrying a screw-spindle $t$ provided with a hand-wheel $s$. The spindle $t$ acts on a strong spring $u$, the free ends of which bear upon the bearings $v\ v$ of a roller $w$, the said bearings being movable in the frame $r$. The straining device is also provided with a power-measuring device for the purpose of measuring the strain put on the belt. This device consists of projections $a'\ a'$ which are rigidly fixed to the spring $u$ and carry rods $b$, which rest with their ends together when the spring is in its normal (unstrained) condition. When, however, pressure is applied to the spring the rods move away from each other and the extent of such motion serves to measure the force exerted on the spring $u$, for which purpose a divided scale is provided.

To test and strain a driving-belt, it is coiled upon the pulley $k$. Its free end is drawn through between the bars $l$ and the rollers $w$ of the straining devices B, and is attached to the shaft $i$ by means of the wedge $q$, and then by rotating the screw-spindles $t$ the desired strain is exerted upon the belt by means of the rollers $w$.

By rotating the shaft $i$ the belt is drawn through between the straining devices B and coiled upon the shaft $i$.

We wish it to be particularly understood that we do not limit ourselves to the precise details of construction hereinbefore described, and illustrated by the accompanying drawings, but that we hold ourselves at liberty to make such changes and alterations as fairly fall within the spirit and scope of our invention.

What we claim, and desire to secure by Letters Patent of the United States, is—

A belt stretching or straining machine consisting essentially of the frame A, the stretching devices B, each of which consists of a roller w the movable bearings v of which are adapted to be acted upon by means of a screw-spindle t and spring u, the shafts k and i and the gearing for actuating the shaft i, substantially as described.

In witness whereof we hereunto set our hands in presence of two witnesses.

ANDOR PALENCSAR.
    THEODOR FISCHER.

Witnesses:
 PEREGRINE VARNALS,
 KARL FRANZ.